United States Patent [19]
Ledakis

[11] Patent Number: 5,758,889
[45] Date of Patent: Jun. 2, 1998

[54] MOBILE PEOPLE CARRIER WITH ADJUSTABLE WIND SCREEN

[76] Inventor: Sherry L. Ledakis, 12732 Via Nieve, San Diego, Calif. 92130

[21] Appl. No.: 667,652

[22] Filed: Jun. 21, 1996

[51] Int. Cl.⁶ .................................................. B62B 7/00
[52] U.S. Cl. .................. 280/47.38; 280/47.4; 280/642; 280/650; 296/77.1; 296/97.21; 297/184.13; 403/391
[58] Field of Search ......................... 280/47.38, 47.39, 280/47.4, 642, 644, 650, 658; 296/97.21, 95.1, 78.1, 77.1, 136, 82; 297/184.13; 403/389, 391, 397

[56] References Cited

U.S. PATENT DOCUMENTS

| | | | |
|---|---|---|---|
| 3,840,161 | 10/1974 | Boggs et al. | 224/5.1 |
| 3,867,833 | 2/1975 | Fleischer | 280/639 |
| 3,917,302 | 11/1975 | Gebhard | 280/36 |
| 3,971,079 | 7/1976 | Fleischer | 5/97 |
| 4,247,130 | 1/1981 | Paterson | 280/654 |
| 4,784,433 | 11/1988 | Purnell-Ayres | 297/184 |
| 4,846,521 | 7/1989 | Takahashi et al. | 296/77.1 |
| 5,184,865 | 2/1993 | Mohtasham et al. | 296/77.1 |
| 5,188,380 | 2/1993 | Tucek | 280/47.38 X |
| 5,224,720 | 7/1993 | Chaw et al. | 280/47.38 X |
| 5,460,395 | 10/1995 | Chen | 280/47.38 X |
| 5,542,732 | 8/1996 | Pollman | 296/77.1 |

FOREIGN PATENT DOCUMENTS 2200327  8/1988  United Kingdom ............... 280/47.38

*Primary Examiner*—Robert J. Oberleitner
*Assistant Examiner*—Pamela J. Lipka
*Attorney, Agent, or Firm*—Don E. Erickson

[57] ABSTRACT

A carrier that is not self-propelled in which a person can be transported, the carrier comprising a base, a handle or frame by which the carrier may be pushed or carried by a person walking behind the carrier, a frame supported on the base, the frame including at least two spaced-apart handle connecting members extending from the handle, a flexible, transparent, plastic wind screen adapted to be positioned in front of a person riding in the carrier, and at least two securement devices attached to the wind screen for securing the wind screen to the handle connecting members/frame so that the wind screen subtends the distance between the handle connecting members.

12 Claims, 5 Drawing Sheets

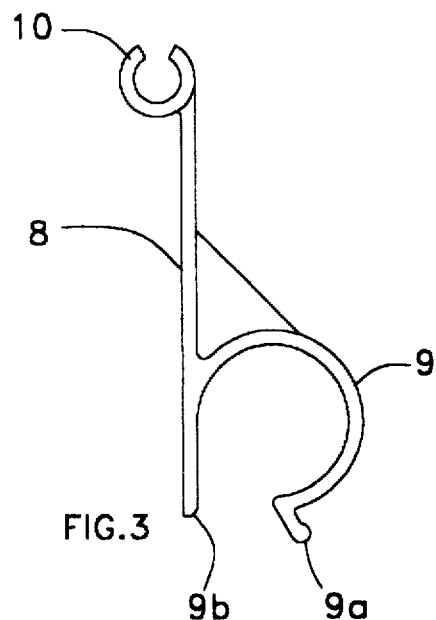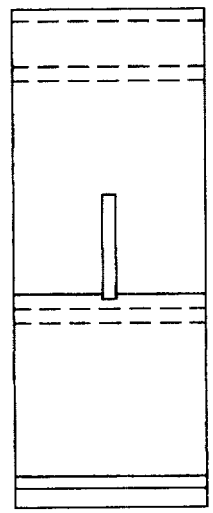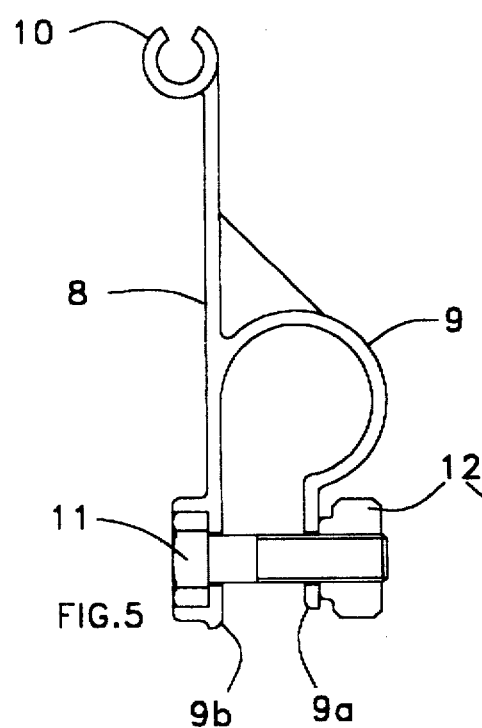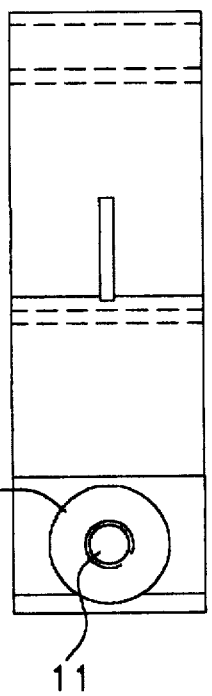

MOBILE PEOPLE CARRIER WITH ADJUSTABLE WIND SCREEN

BACKGROUND OF THE INVENTION

1. Field of the Invention

This invention relates generally to baby strollers, wheel chairs, car seats, baby bouncers, and similar people carriers and holders. More specifically, it relates to such people carriers/holders having protective shields, canopies and/or other devices for shielding the occupant from effects of the sun and weather.

2. Prior Art

The prior art is rife with references which disclose strollers and wheelchairs having canopies. U.S. Pat. No. 5,184,865 to Mohtasham, et al, which discloses a collapsible insect netting to be used in combination with a baby stroller, is typical of much of the art. The netting is disposed about the stroller by means of tubular framing which is fixed in relation to the stroller. The '865 invention is not adjustable according to any change of position of the carrier in relation to the sun and other elements.

U.S. Pat. No. 5,277,213 to Mitchell discloses a portable, foldable canopy which may be attached to a stroller. A rigid material, such as a paperboard material, is formed on a tubular frame and fixedly positioned to provide shelter from the elements. The '213 invention is not adjustable according to any change of position of the carrier in relation to the sun and other elements.

U.S. Pat. No. 3,840,161 to Boggs, et al. is directed to a detachable canopy for a child carrying device. The canopy has a frame section and a covered section which can be a form of a lightweight material such as fabric or plastic. The frame legs are detachably mounted to the handlebars. This reference does not disclose a flexibly adjustable wind screen, nor does the '161 reference disclose the use of an ultraviolet blocking plastic material to protect the passenger from harmful radiation from the sun. U.S. Pat. Nos. 3,961,803 and 3,971,079 to Fleischer also disclose the use of plastic in a baby shield, however the shields disclosed completely enclose the baby carrier and are not adjustable according to any change of position of the carrier in relation to the sun and other elements. Neither do such references disclose the use of an ultraviolet blocking plastic material which is flexibly attachable to the carrier.

U.S. Pat. No. 2,631,287 to Malcom, Jr. is typical in describing uses of a rigid plastic material as a visor in structures such as face protectors, motorcycle helmets and the like. Such visors are fixed in relation to the structure on which they are mounted and are not positionally adjustable to the direction of the elements.

Although plastic visors for motorcycle helmets and other similar devices have been known for a number of years, no one has conceived of incorporating a flexible, adjustable wind screen to a carrier of the type of the invention. And further, no one has conceived of utilizing a wind screen fabricated of a plastic material which may be adjusted according to the position of the carrier relative to the elements, and no one has conceived of utilizing a transparent material which blocks harmful ultraviolet rays generated by the sun.

OBJECTS OF THE INVENTION

It is therefore a principal object of the present invention to provide a holder/carrier with adjustable wind screen. It is a further object of the present invention to provide a holder/carrier with a flexible wind screen which protects against the harmful effects of ultraviolet rays, the wind screen being of a configuration which is easily readily adapted to existing holders/carriers such as car seats, baby bouncers, strollers or wheelchairs, and which may be easily adjusted to various relationships to the sun and wind.

SUMMARY OF THE INVENTION

The invention described herein is generally shown in FIG. 1 and is comprised of a holder/carrier that is not self-propelled in which a person can be transported, the holder/carrier having a base, a handle by which the holder/carrier may either be carried or pushed by a person walking behind the holder/carrier, a frame supported on said base, said frame including at least two spaced-apart handle connecting members extending from the handle, a flexible, transparent, plastic wind screen adapted to be positioned in front of a person riding or sitting in the holder, and at least two securement means attached to the wind screen for securing the wind screen to the handle connecting members, or to the frame of the holder/carrier, so that the wind screen subtends the distance between the handle or the frame of the connecting members, and wherein said transparent screen is made from an ultraviolet-blocking plastics material. The base of the holder may or may not include wheels, such that the holder may be pushed or towed by someone walking behind or in front of the holder.

BRIEF DESCRIPTION OF THE DRAWINGS

FIG. 3 is a side elevation of a first securement means for attaching the visor to the carrier.

FIG. 4 is a plan view of the means of FIG. 3.

FIG. 5 is a side elevation of a second securement means.

FIG. 6 is a plan view of the means of FIG. 5.

DETAILED DESCRIPTION OF THE PREFERRED EMBODIMENTS

Figure 1:
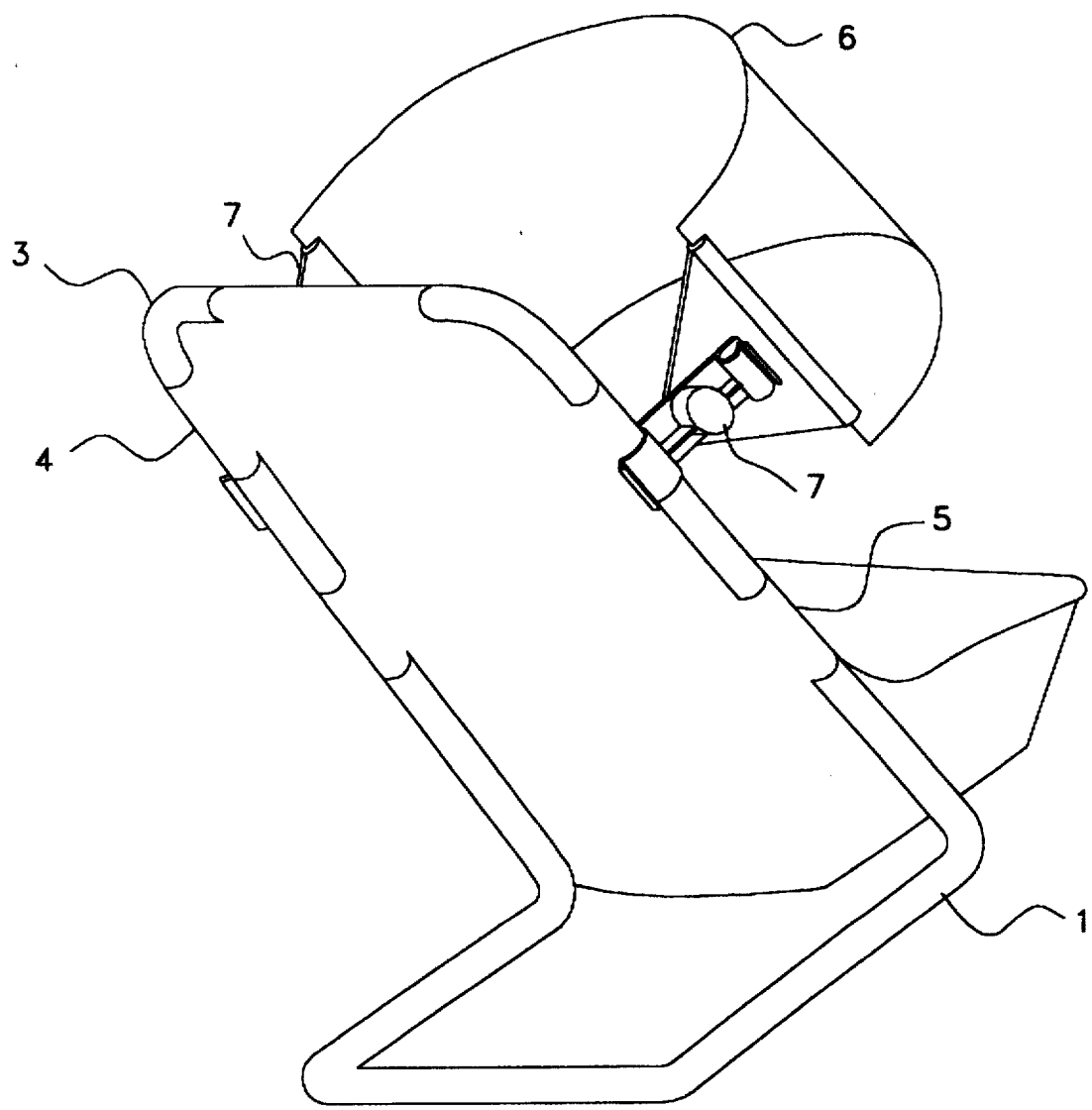
FIG. 1 is a three-dimensional view of the carrier and visor of the invention.

Referring now to the drawings wherein like numerals designate like parts throughout the various views, in a first preferred embodiment, the holder/carrier of FIG. 1 was fabricated, the holder/carrier, subsequently referred to throughout as the "carrier," comprised a base 1, a handle 3 by which the carrier may be grasped by a person, a frame 4 supported on said base 1, seating means for a passenger were attached to the frame, the frame 4 included two spaced-apart handle connecting members 5 which extended from the handle, a flexible, transparent, plastic wind screen 6 was adapted to be positioned in front of a passenger riding in the carrier, and two securement means 7 were attached to the wind screen 6 for securing the wind screen 6 to the handle connecting members 5 so that the wind screen 6 subtended the distance between the handle connecting members 5. The securement means 7, FIGS. 3 and 4, consisted of a flange 8 having a frame clip 9 portion and a wind screen clip 10 portion, the frame clip 9, having a lip 9a at its distal end and an opposing flange member 9b, the frame clip 9 defining a cavity substantially the shape of the handle connecting members' 5 cross-section. The frame clip 9 described an arc of between 220° and 300°, providing access for receiving the handle connecting member 5. The frame clip 9 was fabricated from a semi-rigid plastic, enabling flexing of the frame clip 9 at its distal end 9a to permit frictional securement of the frame clip 9 to the handle connecting member 5. The wind screen clip 10 defined a cavity substantially the shape of the wind screen 6 cross-section, the wind screen clip 10 also described an arc of between 220° and 300°, providing access for receiving the wind screen 6. The wind screen clip 10 was also fabricated from a semi-rigid plastic, enabling flexing of the wind screen clip to permit frictional securement of the wind screen 6 to the wind screen clip 10. This exemplary embodiment describes a means of attachment of the wind screen 6 to the wind screen clip 10 which requires no alterations of the wind screen 6 to include holes or slots for securing the wind screen clip 10 with standard screws, bolts and nuts, snaps, rivets, or the like. However, it contemplated that in this embodiment, and all subsequent embodiments, such alternate means of attachment of the wind screen 6 to the wind screen clip 10 could be utilized. In the first embodiment of the invention, and in other embodiments, the flexible plastic screen had the property of blocking ultra-violet rays generated by the sun.

Figure 2:
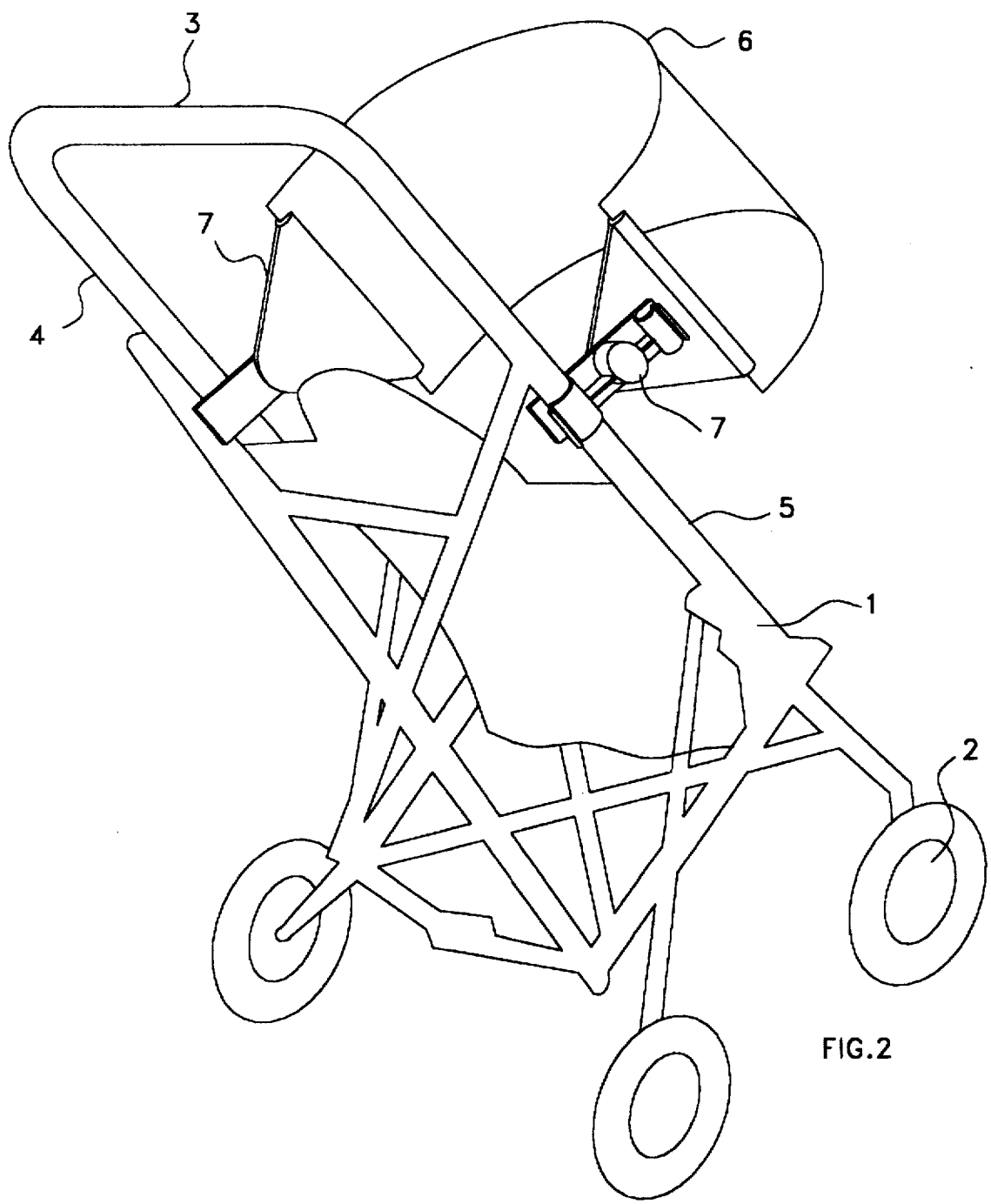
FIG. 2 is a three-dimensional view of carrier of the first preferred embodiment.

FIG. 2 depicts a carrier in which the base 1 included three wheels 2, a handle 3 by which the carrier was pushed by a person walking behind the carrier, a frame 4 supported on said wheels, seating means for a passenger were attached to the frame, the frame 4 included two spaced-apart handle connecting members 5 which extended from the handle, a flexible, transparent, plastic wind screen 6 was adapted to be positioned in front of a passenger riding in the carrier, and two securement means 7 as generally described above were attached to the wind screen 6 for securing the wind screen 6 to the handle connecting members 5 so that the wind screen 6 subtended the distance between the handle connecting members 5. Although in this embodiment, the carrier is adapted to be pushed, it is also contemplated that the carrier may be adapted to be towed.

In a third embodiment, the carriers 1 of the first and second embodiments were utilized, however, an alternate securement means 7, FIGS. 5 and 6, comprised a flange 8 having a frame clip 9 portion and a wind screen clip 10 portion, the frame clip 9, having a lip 9a at its distal end and an opposing flange member 9b, however, in contrast to the first embodiment, the lip 9a and the flange member 9b were each extended to permit the inclusion of opposing cavities wherein a standard bolt 11 was inserted therebetween and nut 12 threadedly received on such bolt 11 to secure the frame clip 9 to the handle connecting member 5. As in the first embodiment the frame clip 9 described an arc of between 220° and 300° to provide access for receiving the handle connecting member, and the frame clip was fabricated of a semi-rigid plastic material enabling flexing of the frame clip 9 to permit frictional securement of the frame clip to the handle connecting member.

Figure 7:
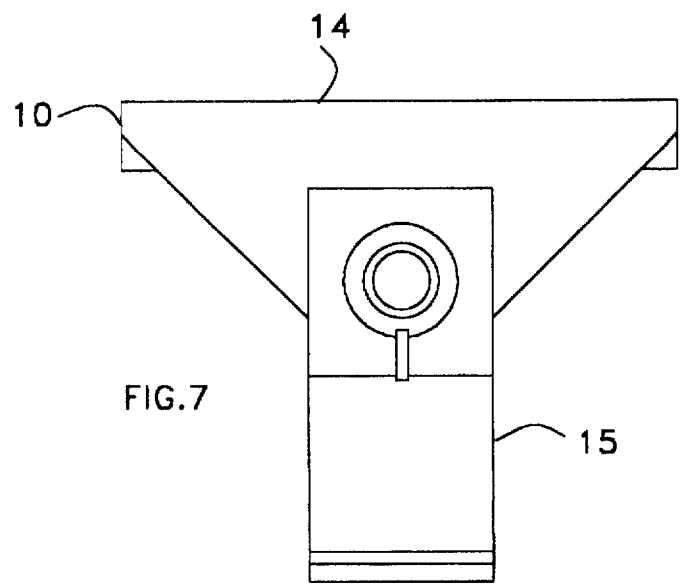
FIG. 7 is a plan view of a third securement means.
Figure 8:
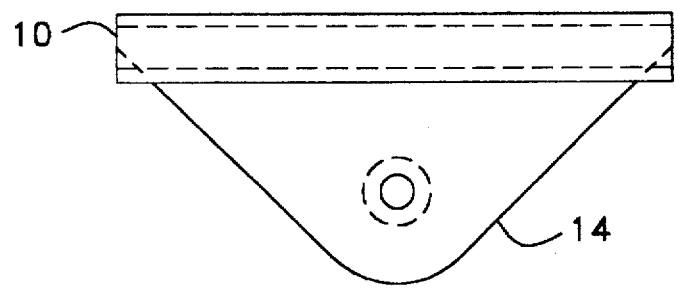
FIG. 8 is a plan view of the wind screen component of the third securement means.
Figure 9:
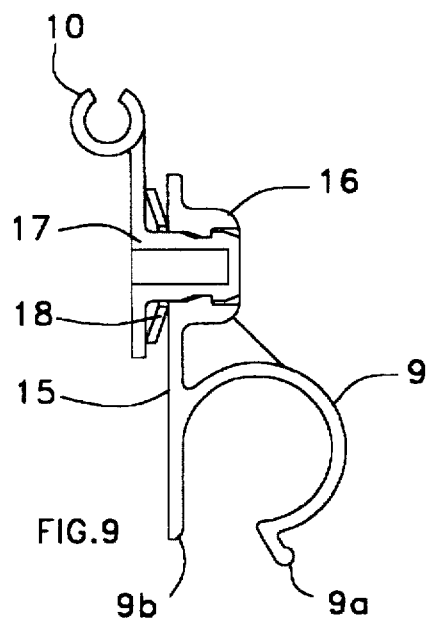
FIG. 9 is a side elevation of the third securement means.
Figure 10:
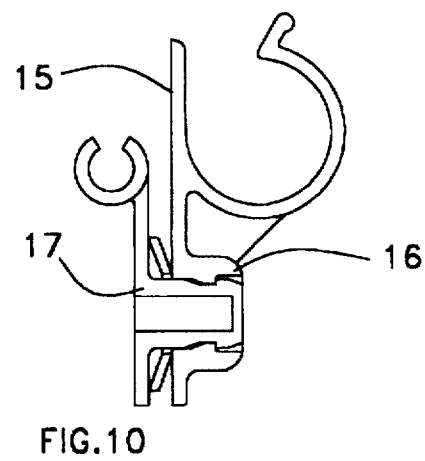
FIG. 10 is a side elevation of the securement means of FIG. 9 with the flange rotated 180°.
Figure 11:
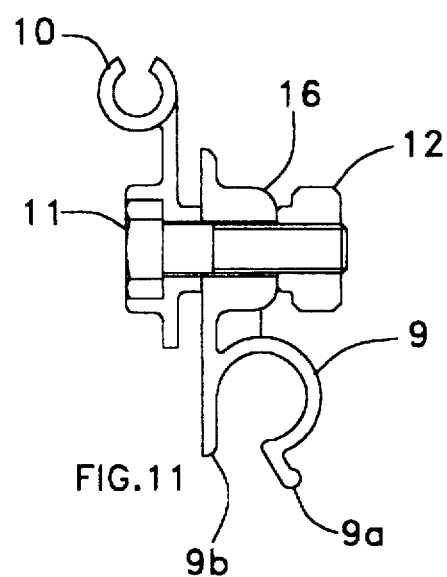
FIG. 11 is a side elevation of a fourth securement means.
Figure 12:
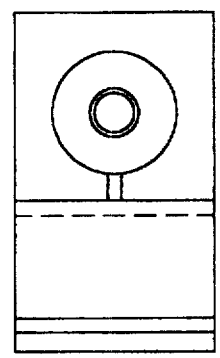
FIG. 12 is a plan view of the means of FIG. 11.

In a fourth embodiment, the carrier 1 of the second embodiment was utilized, however, the securement means 7, FIGS. 7, 8 and 9, comprised a frame flange 15 and a wind screen clip flange 14. The frame flange 15 having a frame clip 9 portion and a frame hub 16 portion. The frame clip 9 defined a cavity substantially the shape of the handle connecting members' 5 cross-section, the frame clip 9 describing an arc of between 220° and 300°, providing access for receiving the handle connecting member. Again, the frame clip was fabricated from a semi-rigid plastic, enabling flexing of the frame clip 9 to permit frictional securement of the frame clip 9 to the handle connecting member 5. The frame hub 16 defined a cavity for receiving the wind screen clip flange 14. The wind screen clip flange 14 had a wind screen clip 10 portion and a shaft 17 for adjustably engaging the frame hub 16. The wind screen clip 10 defined a cavity substantially the shape of the wind screen 6 cross-section, the wind screen clip 10 describing an arc of between 220° and 300°, providing access for receiving the wind screen. Again, the wind screen clip was fabricated from a semi-rigid plastic, enabling flexing of the wind screen clip 10 to permit frictional securement of the wind screen 6 to the wind screen clip 10. The frame flange 15 and the wind screen clip flange 14 were locked together by means of a spring washer 18. FIG. 9 shows the securement means of FIG. 6 wherein the frame flange 15 has been rotated 180° in relation to the wind screen clip flange 14. Although in this exemplary embodiment spring washer 18 was employed, other biasing means may be utilized. For example, in the securement means 7 of FIGS. 10 and 11, a standard bolt 11 and nut 12, as disclosed in the second embodiment, were utilized to adjustably affix the frame hub 16 to the wind screen clip flange 14.

In the exemplary embodiments of the invention, the frame clips 9 were constructed to have circular cavities for receiving the handle connecting members 5, however, rectangular and other geometrically shaped cavities may also be utilized.

While the present description contains many specificities, these should not be construed as limitations on the scope of the invention, but rather as an exemplification of one/some preferred embodiment/s thereof. Many other variations are possible. Accordingly, the scope of the invention should not be determined by the specific embodiment/s illustrated herein, but the full scope of the invention is further illustrated by the claims appended hereto.

I claim:

1. A carrier that is not self-propelled in which a person can be transported, the carrier comprising:
   (a) a base;
   (b) a handle by which the carrier may be grasped by a person;
   (c) a frame supported on said base, said frame including at least two spaced-apart handle connecting members extending from the handle;
   (d) a flexible, transparent, plastic wind screen adapted to be positioned in front of a person riding in the carrier; and
   (e) at least two securement means attached to the wind screen for securing the wind screen to the handle connecting members so that the wind screen subtends the distance between the handle connecting members, the securement means comprising:
   (i) a handle connecting flange having a frame clip portion and a hub portion;
   (ii) the frame clip portion defining a cavity substantially the shape of the handle connecting members' cross-section for receiving the handle connecting member;
   (iii) the hub defining a hub cavity for receiving a wind screen clip flange;
   (iv) the wind screen clip flange having a wind screen clip portion and a shaft for adjustably engaging the hub;

(v) the wind screen clip portion defining a cavity substantially the shape of the wind screen cross-section for receiving the wind screen; and (vi) locking means for locking the handle connecting member flange to the wind screen clip flange.

2. The carrier of claim 1 wherein said wind screen is formed of an ultraviolet-blocking plastics material.

3. The carrier of claim 1 wherein the base includes at least two wheels.

4. The carrier of claim 1 in which the frame clip portion is secured to the handle connecting member by means of bolts threadedly connected to nuts, or by rivets.

5. The carrier of claim 1 in which the wind screen is secured to the wind screen clip by means of bolts threadedly connected to nuts, or by rivets.

6. The carrier of claim 1 wherein the locking means is a spring washer.

7. A carrier that is not self-propelled in which a person can be transported, the carrier comprising:

(a) a base;

(b) a handle by which the carrier may be grasped by a person;

(c) a frame supported on said base, said frame including at least two spaced-apart handle connecting members extending from the handle;

(d) a flexible, transparent, plastic wind screen adapted to be positioned in front of a person riding in the carrier;

(e) at least two handle connecting flanges, the two flanges each having a frame flange and a wind screen flange, the handle connecting flanges attached to the wind screen for securing the wind screen to the handle connecting members so that the wind screen subtends the distance between the handle connecting members;

(f) the frame flange having a frame clip portion and a hub portion;

(g) the frame clip portion defining a cavity substantially the shape of the handle connecting members' cross-section for receiving the handle connecting member;

(h) the hub defining a hub cavity for receiving a wind screen clip flange;

(i) the wind screen flange having a wind screen clip portion and a shaft for adjustably engaging the hub;

(j) the wind screen clip portion defining a cavity substantially the shape of the wind screen cross-section for receiving the wind screen; and (k) locking means for locking the frame flange to the wind screen flange.

8. The carrier of claim 7 wherein said wind screen is formed of an ultraviolet-blocking plastics material.

9. The carrier of claim 7 in which the frame clip portion is secured to the handle connecting member by means of bolts threadedly connected to nuts, or by rivets.

10. The carrier of claim 7 in which the wind screen is secured to the wind screen clip portion by means of bolts threadedly connected to nuts, or by rivets.

11. The carrier of claim 7 wherein the locking means is a spring washer.

12. The carrier of claim 7 wherein the base includes at least two wheels.

* * * * *